United States Patent [19]

Popp et al.

[11] 4,011,161
[45] Mar. 8, 1977

[54] TREATMENT OF WASTE WATER PRODUCED IN THE MANUFACTURE OF EXPANDABLE POLYSTYRENE

[75] Inventors: Karl Hugo Popp, Frankenthal; Klaus Hess, Bad Durkheim; Werner Simmler, Ludwigshafen; Richard Stickel; Ludwig Zuern, both of Bad Durkheim, all of Germany

[73] Assignee: Badische Anilin- & Soda-Fabrik Aktiengesellschaft, Ludwigshafen (Rhine), Germany

[22] Filed: Jan. 23, 1975

[21] Appl. No.: 543,522

Related U.S. Application Data

[63] Continuation of Ser. No. 337,658, March 2, 1973, abandoned.

[30] Foreign Application Priority Data

Mar. 2, 1972 Germany .......................... 2209986

[52] U.S. Cl. ............................................. 210/44
[51] Int. Cl.² .......................................... C02C 5/00
[58] Field of Search ............................. 210/44, 221

[56] References Cited

UNITED STATES PATENTS

| | | | |
|---|---|---|---|
| 3,160,586 | 12/1964 | Duke | 210/44 |
| 3,203,893 | 8/1965 | House et al. | 210/44 |
| 3,232,434 | 2/1966 | Albersmeyer | 210/17 |
| 3,434,968 | 3/1969 | Lowe | 210/44 |
| 3,510,001 | 5/1970 | Baer et al. | 210/44 |
| 3,855,124 | 12/1974 | Lapidot | 210/44 |

FOREIGN PATENTS OR APPLICATIONS 83,239  7/1971  Germany ........................... 210/44

*Primary Examiner*—Thomas G. Wyse
*Attorney, Agent, or Firm*—Johnston, Keil, Thompson & Shurtleff

[57] ABSTRACT

Treatment of waste water produced in the manufacture of expandable polystyrene, comprising passing a stream of fine gas bubbles through the waste water and removing the resulting foam containing a high concentration of impurities from the aqueous phase. In a special embodiment of the invention, the aqueous phase can then be subjected to further treatment.

7 Claims, 2 Drawing Figures

TREATMENT OF WASTE WATER PRODUCED IN THE MANUFACTURE OF EXPANDABLE POLYSTYRENE

This is a continuation, of application Ser. No. 337,658 filed Mar. 2, 1973, now abandoned.

Waste water produced in the manufacture of expandable polystyrene contains organic components consisting of unfoamed polystyrene in the form of beads of various sizes and also finely divided solid impurities in suspension (styrene emulsion polymers) and portions of the protective colloids in the bead polymerization. Such waste waters have a fairly high biochemical oxygen demand (BOD). The suspended solids give the waste water a milky appearance and are stabilized against coagulation or flocculation by the presence of residues of the suspension stabilizer used.

The finely divided suspended solids cannot be removed by the usual methods of separation such as filtration, on account of their small particle size. Neither does flocculation using conventional flocculants as employed in waste treatment plants lead to any success.

Attempts have already been made to treat waste water with iron (III) salts and aluminum salts and alkalis or hydrated lime. These processes are very expensive, however, and unreliable. In addition to a high consumption of chemicals, these processes produce relatively large amounts of sludge having a low solids content, the separation, dehydration and disposal of which are extremely difficult.

It is not possible to carry out a normal activated sludge treatment for the reduction of the BOD in these very cloudy waste waters. On the contrary, it has been found that although antifoaming agents are added to the system a large amount of foam is formed and this, due to its agglutinative properties, extracts the activated sludge necessary for biological decomposition of the solids in the waste water. As a result, the concentration of microbes in the tank lessens progressively with a consequent progressive reduction in the disintegrating effect achieved. The suspended matter is removed only to a small extent by this biological treatment.

It is an object of the present invention to provide a process for the treatment of waste water produced in the manufacture of expandable polystyrene, which process is free from the above drawbacks of prior art processes.

According to the present invention, this object is achieved in a process for the treatment of waste water produced in the manufacture of expandable polystyrene comprising passing a stream of fine gas bubbles through the waste water and removing the resulting foam containing a high concentration of suspended matter from the aqueous phase. If desired, detergents may be added to the waste water in order to increase the foaming effect and thus improve the clarifying activity. If necessary, the waste water remaining after removal of the foam may be subjected to an aftertreatment, for example by biological means, by ultrafiltration, ozonization, treatment with activated charcoal and the like.

In carrying out the process of the invention, it is convenient to use air as the gaseous medium, this being introduced into the waste water in the desired form of fine bubbles by means of fritted glass disks, nozzles and the like. Usually, vertical liquid columns will be used, the stream of air being caused to flow upwardly therethrough.

The process of the invention can be used for treating the waste waters obtained in the manufacture of expandable polystyrene, optionally together with waste waters occurring in the manufacture of polymer dispersions. The waste water may be fed to our process either without previous treatment, i.e. in the form of mother liquor as produced in the production plant, or after dilution with the wash water. We have found that dilution with wash water or considerable removal of suspended matter by mechanical means of separation, or both types of pretreatment together, generally give better results than untreated liquors.

The process of the invention is founded on the physical phenomenon that a surface-active agent present in a solution accumulates at the interface between the solvent and a gas as determined by an equilibrium concentration dependent on the system. By continuous removal of the phase interface, for example in the form of a foam, the concentration of the surface-active substance in the residual solvent is gradually reduced to a minimum concentration which is no longer sufficient for the formation of a stable foam. At the same time, it is possible to remove in this manner dissolved or suspended matter which also migrates to the interface due to a greater affinity for the surface-active molecules than for the molecules of the solvent.

To carry out the process of the invention, for example pure mother liquor as produced in the manufacture of expandable polystyrene and containing from about 0.5 to 2.5% by weight of unfoamed polystyrene beads in suspension is pumped to an aeration tank. Feeding by pump is convenient but feeding may be effected in other manner, for example by gravity. The liquid is fed to the aeration tank at a point between the top and bottom thereof and advantageously at a point just below the surface of the liquid therein. However, there is no reason why the waste water should not be fed to the tank in the region of foam formation. The tank used for aeration of the waste water is preferably divided into a number of separate sections succeeding one another in the direction of flow of the water. The water may pass from section to section either by simple overflow or by means of pumps. The plan cross-section of the aeration tank has no immediate influence on the efficiency of the process and it may be circular, square or rectangular. Where round tanks are used, the cascade may be achieved by arranging a number of separate tanks in series or by dividing a large tank into a number of equally or unequally large circular sections or segments. Subdivision may also be provided by means of a meandering arrangement of partitions. Corresponding arrangements may also be achieved with tanks of square or rectangular plan cross-section.

The introduction of gas, preferably air, into the water may be effected in various ways. In the simplest case, the gas may be dispersed in the water through a porous plate of sintered ceramics or sintered metal. Equally suitable is a systematic arrangement of holes of specific sizes in a base plate or a corresponding arrangement of nozzles. The latter afford more economical means of producing bubbles of small diameters.

As the gas bubbles rise through the water, the surface-active materials are selectively adsorbed at the phase interface. The adsorption equilibrium is determined by the rate of diffusion of the surface-active molecules. The adsorption equilibrium, together with the velocity of ascension of the gas bubbles, determines the level of the water necessary for a state of equilibrium. We have found that levels of up to about 1 meter are sufficient in the case of bubble diameters of about 1 mm. Small bubble diameters, as are produced when nozzles are used, permit a reduction of the water level to about 0.5 m.

The pressure of the gas blown up through the aeration tank causes the foam which is formed at the surface of the water to leave the aerating tank either immediately above the surface of the water in an upward direction or laterally through a tube or channel. However, the foam can leave the aeration tank only after a specific residence time depending on the size of the foam chamber provided above the water level or, in the case of separate tanks, laterally of the column of water and by the rate of flow of the foam. By maintaining a definite residence time, it is possible to reduce the water content of the foam, i.e. increase the concentration of detergent therein, according to the water-losing properties of the foam as a result of a fractionating effect. This effect may also be achieved by recycling part of the broken foam to the top of the foam chamber.

The high solids foam, on leaving the aeration tank, may be used as such or broken down by means of a blower. This may also be effected by the usual methods of foam destruction involving heating, subjecting to pressure or to mechanical energy.

The foam should be broken in such a manner that not all of the foam bubbles are destroyed. In this manner, further concentration of the surface-active materials is achieved in the residual foam. If this is not processed directly, it can be passed, after separation of foam water, to a water separating tank for substantial dehydration with a corresponding rise in the concentration of solids. In this tank it is necessary to maintain a specific residence time determined by the water-losing properties and the desired solids concentration of the foam.

If a solids concentration of about 26% w/w can be achieved in this manner, and if the solid is of organic origin, it is possible to burn the foam without the use of added fuel. Burning may be carried out in a suitable combustion chamber or muffle furnace. The foam is conveniently conveyed from the settling tank to the combustion chamber pneumatically, the air required for combustion also acting as conveying medium. Blending of the foam with air may be effected by an injector system or by suitable mechanical means.

The foam water produced by partial destruction of the foam may be separated from the residual foam in a separating vessel and repumped to the first stage of the aeration tank. If the foam water has a higher concentration of detergents than the untreated water, this water may be worked up in a separate aeration tank.

Figure 1:
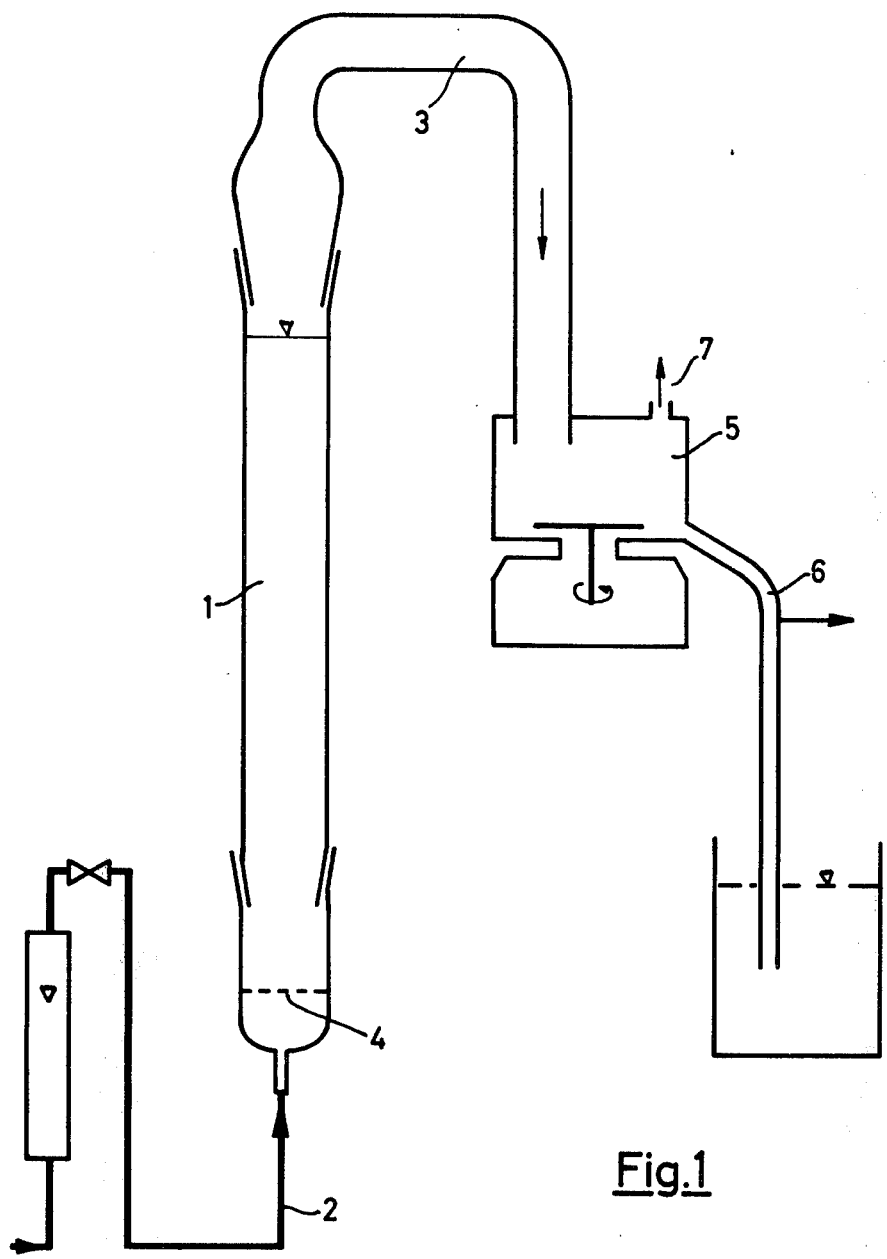
FIG. 1 is a flow diagram of a batch method for carrying out the process.

An embodiment of an apparatus for batchwise operation of the process of the invention is illustrated diagrammatically in FIG. 1 of the accompanying drawings.

The apparatus has an aeration column 1 provided at its bottom end with an air inlet 2 and at its top end with an overflow 3. The bottom section of the aeration column 1 has a sintered glass frit 4. The overflow 3 leads to a centrifuge 5 provided with a discharge line 6 and an air outlet 7. The aeration column also has inlets and outlets for the waste water to be purified (not shown in the Figure).

Figure 2:
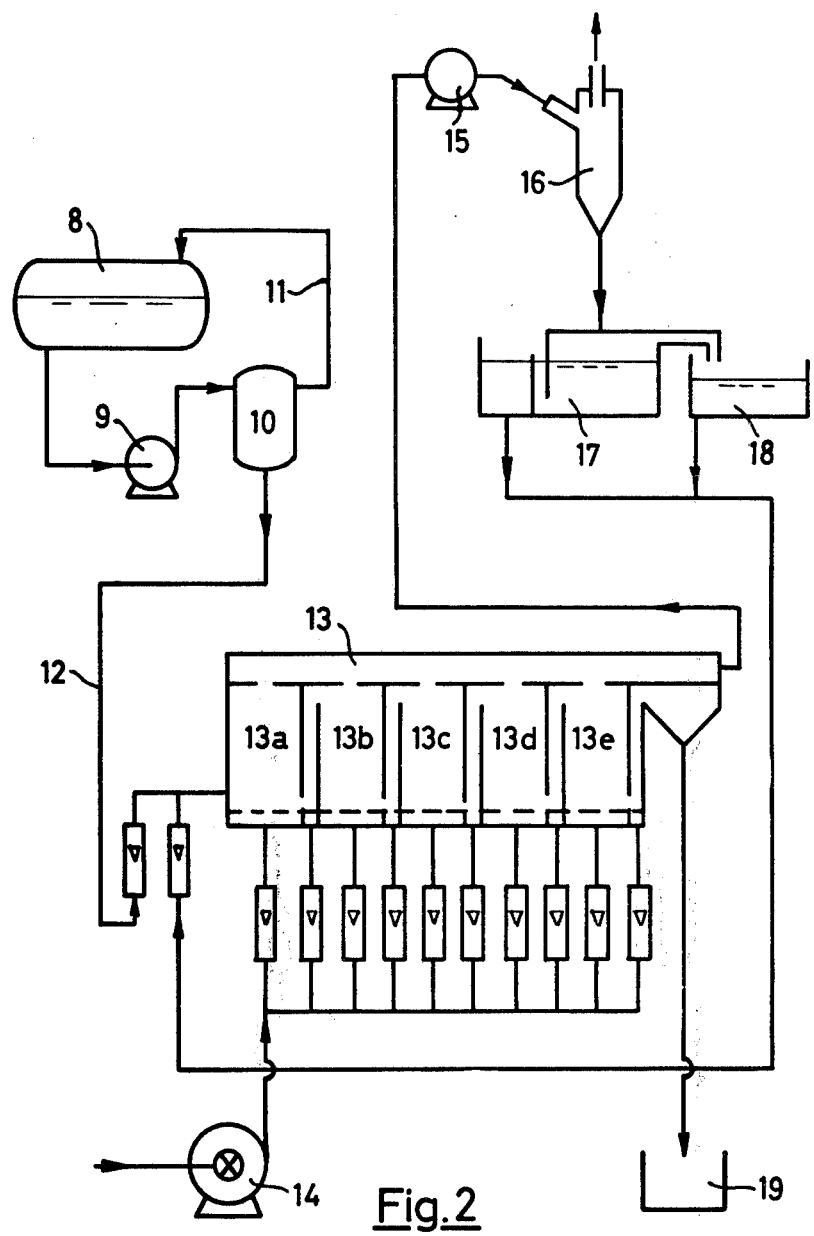
FIG. 2 is a flow diagram of a continuous method of carrying out the process of the invention.

FIG. 2 illustrates an embodiment of an apparatus for continuous operation of the process of the invention. The apparatus has a storage tank 8 for the waste water. The storage tank 8 is connected via a pump 9 to an overflow tank 10 having an inlet line 11 connected to the storage tank 8 and an outlet line 12 connected to the foam separating plant 13. The foam separating plant has five separate chambers 13a to 13e arranged in series and separated from one another by partitions. The flow of water from chamber to chamber takes place on the air-lift principle and may be adjusted for each chamber separately by adjusting the rate of flow of the entraining air. The air used for aeration is drawn from the atmosphere, together with the entraining air, by means of a blower 14 and is passed to each chamber separately via rotameters. The aerating air introduced into the water is broken up into a number of bubbles of approximately equal diameter by means of a system of air holes provided in the base of each chamber. Above the air distributing system and at right angles to the direction of flow of the water from chamber to chamber there are provided baffle plates, which are parallel to the row of holes and ensure even flow of the water within each chamber. The foam formed at the surface of the water in each chamber is collected in a foam chamber disposed downstream of the chamber and laterally thereof, and this foam is sucked from the plant through a common line by means of blower 15. The major portion of the foam is destroyed in blower 15. The resulting water/foam mixture is passed to a cyclone 16 for separation of the air. Downstream of the cyclone there is a separating vessel 17 in which the foam is separated from the foam water with an increase in the concentration of solids in the foam. The concentrated foam is passed to a settling tank 18 for further removal of water, i.e. increase in the solids content of the foam, whilst the bottom section of the aeration column 1 has a sintered glass frit 4. The overflow 3 leads to a centrifuge 5 provided with a discharge line 6 and an air outlet 7. The aeration column also has inlets and outlets for the waste water to be purified (not shown in the Figure).

FIG. 2 illustrates an embodiment of an apparatus for continuous operation of the process of the invention. The apparatus has a storage tank 8 for the waste water. The storage tank 8 is connected via a pump 9 to an overflow tank 10 having an inlet line 11 connected to the storage tank 8 and an outlet line 12 connected to the foam separating plant 13. The foam separating plant has five separate chambers 13a and 13e arranged in series and separated from one another by partitions. The flow of water from chamber to chamber takes place on the air-lift principle and may be adjusted for each chamber separately by adjusting the rate of flow of the entraining air. The air used for aeration is drawn from the atmosphere, together with the entraining air, by means of a blower 14 and is passed to each chamber separately via rotameters. The aerating air introduced into the water is broken up into a number of bubbles of approximately equal diameter by means of a system of air holes provided in the base of each chamber. Above the air distributing system and at right angles to the direction of flow of water from chamber to chamber there are provided baffle plates, which are parallel to the row of holes and ensure even flow of the water within each chamber. The foam formed at the surface of the water in each chamber is collected in a foam chamber disposed downstream of the chambers and laterally thereof, and this foam is sucked from the plant through a common line by means of blower 15. The major portion of the foam is destroyed in blower 15. The resulting water/foam mixture is passed to a cyclone 16 for separation of the air. Downstream of the cyclone there is a separating vessel 17 in which the foam is separated from the foam water with an increase in the concentration of solids in the foam. The concentrated foam is passed to a settling tank 18 for further removal of water, i.e. increase in the solids content of the foam, whilst the separated foam water is recycled to the first chamber 13a of the foam separating plant. The purified waste water leaves the plant after passing through the fifth chamber thereof and is collected in a receiver 19.

EXAMPLE 1

The process is carried out using an apparatus as illustrated in FIG. 1, the aeration column having a height of 60 cm and an inside diameter of 5 cm. Water-saturated air is fed to the bottom of the aeration column at a rate of from 10 to 150 1/hr and is broken up into fine bubbles in the water by means of the sintered glass frit 4 of pore width D2. At the commencement of the experiment, the water contained in the column had a volume of 1 1, but as the aeration continued the volume of water decreased continuously according to the concentration of foamable matter in the water and the rate of flow of the air. In order to achieve a suitably high solids content in the foam phase with the rate of flow of the foam at an appropriately low level, the rate of flow of the air was adjusted so that foam was just discharged from the aeration column.

Using the above method, it was possible to treat STYROPOR mother liquor having an average content of dissolved and undissolved substances of 1.6% w/w and having the form of a cloudy liquid, so as to remove nearly all of the organic impurities therefrom. The residue obtained after evaporating the clarified water gave a solids content of about 0.1% by weight, this being virtually entirely of inorganic origin. The water was glass-clear. The BOD and organically combined carbon values of the water before and after treatment are listed in the following Table.

|                           | Before aeration | after aeration |
|---------------------------|-----------------|----------------|
| BOD (5 days)              | 1400 mg O$_2$/l | 80 mg O$_2$/l  |
| organically combined carbon | 6000 mg/l     | 300 mg/l       |

The amount of foam formed was between 10 and 30% of the water used. The average content of the foam of dissolved and undissolved matter was from 6 to 12% by weight.

EXAMPLE 2

The process was carried out continuously using the apparatus shown in FIG. 2 and having a capacity of 1 cu.m. In order to avoid sedimentation effects, the waste water was maintained in constant circulation between the storage tank 8 and the overflow tank 10. The rate of flow was about 20 m$^3$/hr, i.e. about 5 storage tank volumes per hour. The waste flowed from the overflow tank 10 to the foam separating plant 13 via a rotameter at rates of from 0.2 to 0.5 m$^3$/hr. The foam separating plant consisted of 5 separate chambers. The base area of each chamber was 0.25 m$^2$, giving a total area of 1.25 m$^2$. The air used for entraining the water from chamber to chamber was consumed at a rate of from 5 to 10 m$^3$/hr. The air used for aerating the water was drawn from the atmosphere, together with the entraining air, by means of blower 14 and passed to each chamber separately via rotameters. The average rate of flow of air through each chamber was about 20 m$^3$/hr. The average rate of water feed was 0.5 m$^3$/hr. This was supplemented by approximately twice as much recycled foam water, giving a throughput of about 1.5 m$^3$/hr. The air required for producing the foam was from 200 to 300 m$^3$/hr. The air required for conveying the water from chamber to chamber was about 50 m$^3$/hr. In each aerating chamber, foam was produced at a rate corresponding to the rate of flow of the fresh waste water. The solids content was, on average, 3% by weight. In the separating vessel, the foam/water mixture leaving the cyclone was separated into the two phases. About 0.13 tons/hr of foam having a content of dissolved and undissolved matter of approximately 7% are passed to the settling tank, whereas 0.87 m$^3$/hr of foam water having a solids content of approximately 2.5% w/w is repumped to the plant. In the settling tank, the average residence time was 5 hours, during which period more water left the foam and the content of dissolved and undissolved matter in the latter rose to 15% by weight with a corresponding reduction in the rate of flow to 0.04 tons/hr. Water having a solids content of 3% by weight was withdrawn from the settling tank at a rate of 0.087 m$^3$/hr and is added to the recycled water at the separating vessel. The amount of clarified water was 0.45 m$^3$/hr. Its solids content was 0.1% by weight. The water had a glass-clear appearance with a slight milky shimmer. The purified water sometimes showed a tendency to flocculate to a slight extent, and the resulting flock could be readily removed in a subsequent filtration stage.

The average purifying efficiency achieved by our foam separating process was 95%, as measured with reference to the amounts of organically combined carbon, BOD and solids content.

We claim:
1. A process for the purification of waste water produced in the manufacture of expandable polystyrene in aqueous suspension and in the presence of protective colloids based on polyvinyl pyrrolidone, said waste water containing unfoamed polystyrene beads, styrene emulsion polymers and portions of the protective colloids which consists essentially of removing suspended solids by mechanical means, diluting with water, passing a stream of small diameter gas bubbles through the resulting liquid, and separating the resulting impurity containing foam from the waste water.
2. A process as set forth in claim 1 wherein said waste water contains from about 0.5 to 2.5% by weight of unfoamed polystyrene beads in suspension.
3. A process as set forth in claim 1 wherein said gas is air.
4. A process as set forth in claim 1 wherein said gas bubbles have a diameter of about 1 mm or less.
5. A process as set forth in claim 1 wherein said foam is partially destroyed and the residual foam separated from the resulting water.
6. A process as set forth in claim 5 wherein said foam water is recycled with untreated waste water.
7. A process as set forth in claim 5 wherein said residual foam containing a solids concentration of about 20% by weight is burned without the use of added fuel.

* * * * *